(12) United States Patent
Borana et al.

(10) Patent No.: US 12,570,025 B2
(45) Date of Patent: Mar. 10, 2026

(54) PROCESS TO HEAT PREFORMED PLASTIC PIPES

(71) Applicant: OPTIFLUX TECH INNOVATIONS PRIVATE LIMITED, Rajasthan (IN)

(72) Inventors: Amit Borana, Rajasthan (IN); Praveen Parihar, Rajasthan (IN)

(73) Assignee: Optiflux Tech Innovations Private Limited, Jodhpur (IN)

( * ) Notice: Subject to any disclaimer, the term of this patent is extended or adjusted under 35 U.S.C. 154(b) by 0 days.

(21) Appl. No.: 18/287,696

(22) PCT Filed: Sep. 30, 2021

(86) PCT No.: PCT/IN2021/050948
§ 371 (c)(1),
(2) Date: Oct. 20, 2023

(87) PCT Pub. No.: WO2022/229969
PCT Pub. Date: Nov. 3, 2022

(65) Prior Publication Data
US 2024/0181679 A1 Jun. 6, 2024

(30) Foreign Application Priority Data
Apr. 26, 2021 (IN) .............................. 202111019032

(51) Int. Cl.
*B29B 13/02* (2006.01)
*B29C 49/42* (2006.01)
(Continued)

(52) U.S. Cl.
CPC ...... *B29B 13/024* (2013.01); *B29C 49/42101* (2022.05); *B29C 49/6418* (2013.01);
(Continued)

(58) Field of Classification Search
CPC ... B29B 13/024; B29C 49/68; B29C 49/6835; B29C 49/6855
See application file for complete search history.

(56) References Cited

U.S. PATENT DOCUMENTS

| | | | | | |
|---|---|---|---|---|---|
| 2,481,130 | A | * | 9/1949 | Lindemuth | ........... F27B 9/2415 |
| | | | | | 198/779 |
| 4,505,670 | A | * | 3/1985 | Silvestrini | ............. F27B 9/2415 |
| | | | | | 432/239 |

(Continued)

FOREIGN PATENT DOCUMENTS

| | | | | |
|---|---|---|---|---|
| DE | 4436577 | C1 * | 2/1996 | ........... B29B 13/024 |
| GB | 1084502 | | 9/1967 | |

(Continued)

OTHER PUBLICATIONS

Indian Patent Office, International Search Report, Jul. 1, 2022.

*Primary Examiner* — Benjamin A Schiffman
(74) *Attorney, Agent, or Firm* — Bay State IP, LLC

(57) ABSTRACT

An Infrared heating system (101) designed for the efficient heating of preformed plastic tubes (106). The system comprises an infrared housing unit with multiple longitudinal strips (107N) of infrared heating elements (103), surpassing the length of the preformed tubes. A handling arrangement involving a series of rollers (202) facilitates the simultaneous oscillation and rotation of the plastic pipes. The inner surface of the infrared housing (102) features strategically positioned reflectors (109N) to enhance the infrared heating effect. The handling arrangement includes longitudinally spaced motorized rollers for axial movement, and motorized wheels (110) and tracks (111) for transverse movement. The infrared housing unit offers multiple temperature zones to suit the characteristics of the plastic pipes and employs temperature sensors (114N) for uniform and precise temperature control. A corresponding process for heating pre- (Continued)

formed plastic pipes is also described, integrating these features for effective and controlled heating.

5 Claims, 3 Drawing Sheets

(51) Int. Cl.

| | | |
|---|---|---|
| *B29C 49/64* | (2006.01) |
| *B29C 49/68* | (2006.01) |
| *B29C 49/78* | (2006.01) |
| *F27B 9/06* | (2006.01) |
| *F27B 9/24* | (2006.01) |

(52) U.S. Cl.

CPC ...... *B29C 49/682* (2022.05); *B29B 2013/027* (2013.01); *B29C 49/42065* (2022.05); *B29C 49/6835* (2022.05); *B29C 49/685* (2022.05); *B29C 2049/7861* (2022.05); *B29C 2949/071* (2022.05); *F27B 9/06* (2013.01); *F27B 9/2407* (2013.01)

(56) References Cited

U.S. PATENT DOCUMENTS

| | | | | |
|---|---|---|---|---|
| 5,006,063 | A * | 4/1991 | Poggi | F27B 9/024 |
| | | | | 432/152 |
| 6,888,103 | B2 * | 5/2005 | Vaughn | B29C 49/6436 |
| | | | | 425/526 |
| 7,133,606 | B1 * | 11/2006 | Elliott | B29B 13/024 |
| | | | | 219/535 |
| 8,303,290 | B2 * | 11/2012 | Feuilloley | B29B 13/024 |
| | | | | 425/526 |
| 10,493,686 | B2 * | 12/2019 | Derrien | B29B 13/024 |
| 2011/0037196 | A1 | 2/2011 | Arena Fernandez | |
| 2011/0291332 | A1 * | 12/2011 | Voth | B29B 13/024 |
| | | | | 425/526 |
| 2012/0269918 | A1 * | 10/2012 | Winzinger | B29C 49/42073 |
| | | | | 425/174.4 |

FOREIGN PATENT DOCUMENTS

| | | | | | |
|---|---|---|---|---|---|
| GB | 1084502 | A | * | 9/1967 | C21D 9/56 |
| GB | 2190733 | A | * | 11/1987 | F27B 9/2423 |

* cited by examiner

1

PROCESS TO HEAT PREFORMED PLASTIC PIPES

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/IN2021/050948 filed on Sep. 30, 2021, and which in turn claims priority under 35 USC 119 to Indian Patent Application number 202111019032 filed on Apr. 26, 2021, the disclosure of which is incorporated by reference herein in its entirety as part of the present application.

FIELD OF INVENTION

The field of invention relates to a system and process to heat a preformed plastic tube for subsequent molecular orientation.

BACKGROUND OF INVENTION

Molecular orientation is a process by which the physical and mechanical properties of a pre-extruded/preformed plastic pipe are improved substantially. The process of molecular orientation delivers a pipe with better pressure handling capability, better impact resistance, better creep behaviour, better resistance to crack propagation, better tensile strength, improved induced stress etc. In general, the molecular orientation is achieved by increasing the diameter of heated preformed plastic pipe at an appropriate temperature and pressure. Accordingly, it is necessary that the preformed plastic pipes are appropriately heated in a controlled environment to keep the preformed plastic pipes ready for the process of molecular orientation.

Currently there are two types of processes by which orientation of preformed plastic pipe is carried out which are off-line or batch process and in-line or continuous process. In the off-line process the pre-extruded preformed plastic pipe is conditioned at the desired temperature and in which means are designed to achieve molecular orientation "pipe by pipe" by expansion in circumferential and axial directions.

A second option is the in-line process, where the thick-walled tube, directly after the extrusion process is conditioned in-line at the orientation temperature, and in which means are incorporated to achieve the molecular orientation by expansion in circumferential and axial directions. The subject matter of the present application follows the first process which is off-line or batch process for the molecular orientation of the plastic pipes. In one of the examples, the preformed plastic pipes are subsequently oriented to make PVC-0 pipes. The PVC-0 pipes are governed by various standard where the subject matter described in the present specification assumes significant importance. For example, the subject matter of the present specification can be used to manufacture PVC-0 pipes governed by (Indian standard IS16647:2017, ISO Standard ISO 16422:2014, USA—ASTM F1483-17, ANSI/AWWA C909-16, Australia—AS/NZS 4441: 2017, Europe—UNE-EN 17176:2019, Canada—CAN/CSA-B137.3.1-13, Russia—GOST R 56927-2016).

The state of art employs various methods to heat the preformed plastic pipes to achieve molecular orientation. For example, publication number WO98/13182 is also worth mentioning among those patents which describe the conditioning of preformed plastic pipes for the subsequent process of molecular orientation. This document describes the process of conditioning of preformed plastic pipes after extrusion and before the orientation process. After extrusion, the preformed plastic pipes are moderately refrigerated to facilitate cutting and then cut to desired lengths. Thereafter the pipes are conditioned at a temperature of 100 degrees by introducing them into a hot-water tank which acts as refrigerating means and cools the tube, thus lowering the temperature. This system consists of a water tank in which preformed plastic pipes are stored for a certain period of time until the pipe reaches the temperature suitable for its molecular orientation.

Although the system described in WO98/13182 is a part of batch/off-line process but it also acts like a continuous work process (the pipes are treated immediately after being extruded and are therefore hot) and that the pipe is cut to desired length when it is still hot and in a plastic state. The tank is equipped with supports to handle and store the pipes at a specific temperature. Water currents are also generated by means of pumps in order to improve the heat transfer. The said system has the following demerits:

Multi-zone processes for the optimization of output and for differential heating the preformed pipe at different points along the length for the formation of integral sockets cannot be implemented as multiple temperatures cannot be maintained inside the tank.

The system is water based which wets the pipe and makes it dirty.

The temperature of water is very high (100° C.) which makes the system unsafe to operate in case of inadequate manipulation and leaks. There are excessive evaporation losses.

This system is based on continuous process taking advantage of residual heat of extrusion contained within the pipe structure and thus cannot accept pipes stored at room temperature.

System starting and stopping time is very long due to high specific temperature requirements.

Pipe handling is difficult as the tank is accessed from the top for feeding and discharge of the pipe. • The system only accepts the material which has a density more than the density of water otherwise the material will not sink.

Temperature uniformity in the pipe thickness cannot be guaranteed due to irregular flow and inefficient pipe handling. It can only be achieved by prolonged conditioning times.

There is also a need to mention another invention with patent number CA02709001 which is also related to the heating of preformed PVC pipes prior to their molecular orientation. This document describes a system in which preformed PVC pipes are heated by means of convection with the help of hot air currents generated by blowers, heaters, deflectors etc.

The said system has the following limitations:

The above system works on the principle of convection in which the pipe is heated with the help of hot air currents thus making the system more power consuming.

The system is very big in size which comprises of systems to accommodate six pipes at a time, heavy pipe handling assembly for the transverse movement of the pipe and rollers for the rotation of the pipe, deflectors, and heavy blowers for generating strong air currents, electric heating elements.

The system described in the above said document number is designed to accommodate six pipes at a time and has provision for transverse displacement of pipes for progressive and uniform heating inside the oven which makes the system complicated and difficult to operate and maintain and is less energy efficient. • Heavy blowers and motors are used to generate heating currents in the above mentioned system as the system working principle is air recirculation in which hot air is re-circulated to heat the pipes by convection thus making the system more power consuming. Furthermore, it is difficult to achieve uniformity of temperature as it is difficult to get uniform distribution of air at each point throughout the length of the pipe which is very important for uniform heating which can be achieved only by longer heating cycles which accounts for more power consumption.

The system has longer starting and stop timings. The system described in above said document number is an air recirculation convection oven which takes long time to heat up the entire assembly i.e. transverse displacement, rollers, deflectors, hot air blowers etc of the oven which needs to be heated first before the pipe is made to enter the oven which makes the system slow and inefficient.

The system described in the above mentioned document number has an entry and exit gate for the feeding and the discharge of the pipe respectively. When the gate will be opened for the entry and exit of the pipe a substantial amount of heat will be lost by the aperture as the system uses heavy air blowing system to generate strong air currents/air flow inside and the hot air will tend to escape through the window/apertures/gate during the feeding and discharge of the pipe and the temperature of the system will drop substantially resulting in energy loss making the system energy inefficient. Furthermore, as the hot air temperature is approximately 100 degree Celsius which is potentially unsafe to operate when the gates open for the feeding and discharge of the pipe.

The system described in the above mentioned document number uses hot air as the heating media. Hot air has the tendency to rise to the top of the chamber such that the heat will tend to be at the top of the chamber where as the pipes are kept at somewhat away from the top thus it will end up in longer heating cycles.

The process of heating preformed pipes prior to the molecular orientation involves the need for different temperatures at different points along the length of the pipe as the socket/head forming portions needs to be heated more as compared to the remaining tube which is difficult to achieve in the system mentioned in the above said document number as the heating is done by hot air currents. It is difficult and inefficient to precisely control the air flow or the air exposure on a particular portion of the pipe. As the system uses hot air re circulation it is difficult to divide the entire area length into multiple zones and control the temperature of each zone separately as there is a strong air current which cannot be separated for each zone.

The above publications describe an oven used to heat preformed tubes to attain the molecular orientation by using media, heating elements, fans, deflectors which distribute the heating current and to achieve uniform heating of preformed tubes. Whereas the process to heat preformed tubes to get uniform molecular orientation is significant to attend the desired strength and durability of preformed plastic pipes, it is also important to note that the heating of preformed plastic pipes requires substantial amount of energy input and transfer of energy thereof from the heating element to the plastic product. The industry today spends substantially to achieve the uniform heating of the preformed plastic pipes prior to their molecular orientation through convection heating systems. Another problem faced by the industry is lack of degree of control on the heat transfer process. The degree of control required in the process shall is in terms of intensity and time of the heat exposure to the preformed plastic pipes in accordance with the physical factors like thickness, length, density and the like of a preformed plastic pipe.

SUMMARY OF INVENTION

An infrared heating system for heating preformed tubes prior to their molecular orientation, wherein the system comprises of infrared heating elements. The system comprises an infrared housing, which is equipped with a plurality of infrared heating elements arranged in a pattern. The infrared housing unit is longer than preformed plastic pipe that enters the infrared housing. Further the system comprises of a handling arrangement which comprises a plurality of rollers. The preformed plastic tubes rotate on a plurality of rollers around the axis of the preformed plastic tubes. In addition, the plurality of rollers cause to move the preformed plastic pipes back-and-forth simultaneously, causing the uniform heating through the infrared heating elements in the infrared housing. Further, the infrared housing comprises reflectors arranged in a pattern to reflect the infrared radiation to a zone of the preformed plastic pipe for efficient heating.

DETAILED DESCRIPTION OF THE INVENTION

Figure 1:
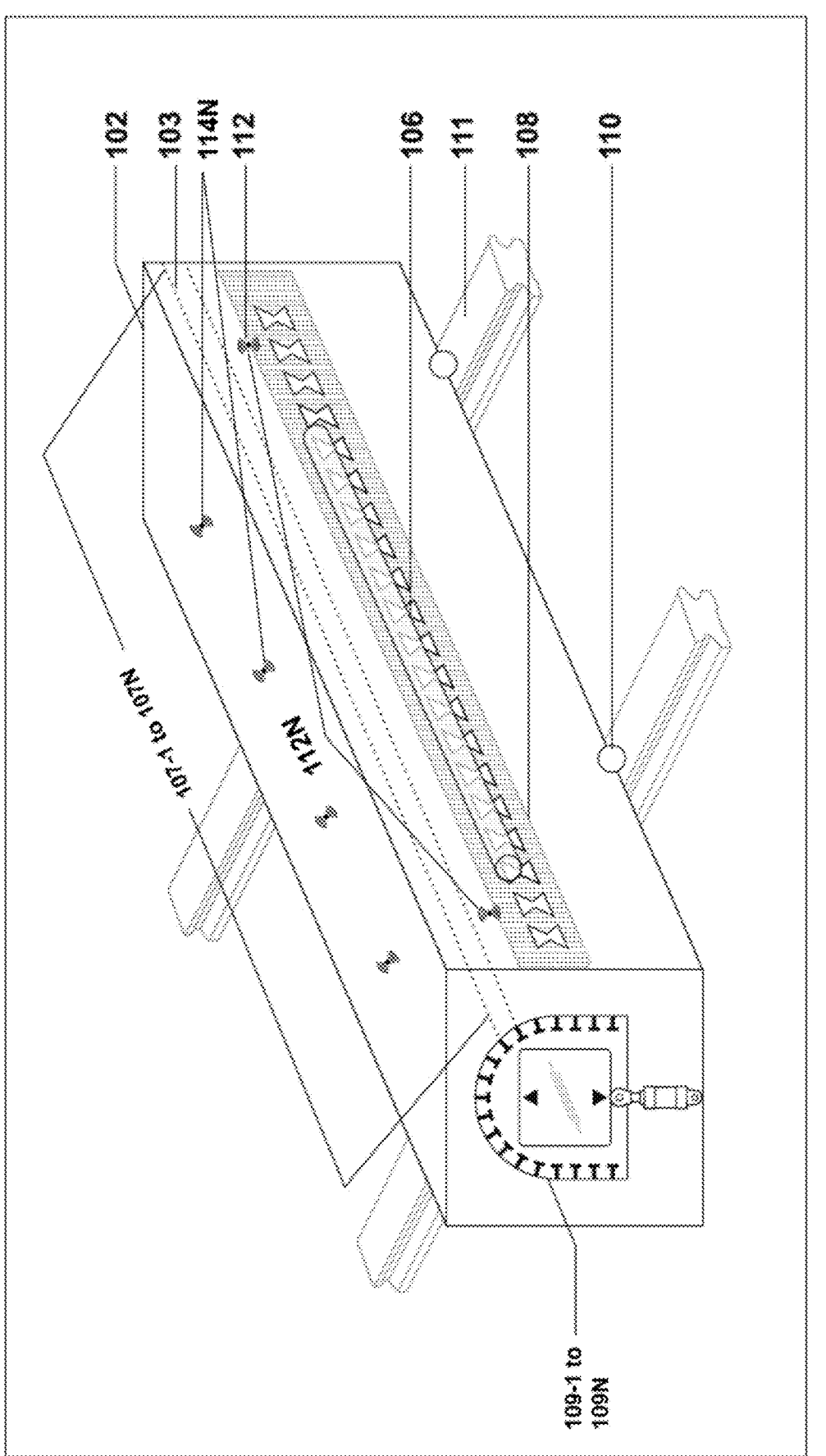
FIG. 1 is the Longitudinal View of the subject matter of the present application.

The heating system and process described herein gives solution for the demerits of the existing systems by way of efficiently providing uniform heat distribution, instant heating, minimal energy loss and shorter dwell timings. Further the system used to achieve the solution is compact in size from the equipment used in the state of art. The system leads to final pipe output with uniform wall thickness and molecular orientation providing greater strength and durability. Accordingly, the object of the present invention is to prepare the preformed plastic tubes for the process of molecular orientation in such a manner that the preformed plastic tubes are heated uniformly throughout its structure before introducing it to the orientation process. Another object of the invention is to control the heat in accordance with the physical characteristics of the pipe at different point along its length. Another object of the present invention is to achieve the uniformity of wall thickness by a system which is compact, fast, energy efficient, safe and easy to operate with cost effectiveness.

The invention described in the present application has following specific advantages:

I. It can adapt to continuous or discontinuous systems indistinctly as it can accommodate preformed plastic pipes which are extruded previously as feedstock pipes at any temperature.

II. It can accommodate jobs with density even lower than the density of water.

III. It uses electromagnetic waves (infrared) to heat the pipe. In particular infrared radiations are disposed directly on to the pipe without the need to heat any media/fluid.

IV. Instant heating is generated as the pipe is heated directly when it is exposed to infrared radiations. No initial heating is required to heat the entire system and the internal assembly before the preformed plastic pipe is made to enter the system.

V. The process requires different temperatures at different portions on the pipe for e.g. if integrated heads are made in the mould then the portion where the heads are formed needs to be heated at a higher temperature then the rest of the pipe which can be easily achieved in case of infrared heating. For example, the socket/head forming portions needs to be heated more as compared to the remaining tube. It is difficult to precisely control the air flow or the air exposure on a particular portion of the pipe and therefore such controlled variation in temperature is inefficient in the state of art which leads to multiple heating of the preformed pipes at different temperatures.

VI. It comprises of an infrared housing unit which is longer than the length of the feedstock pipe such that the pipe is made to oscillate axially to and fro. In addition, the system incorporates a handling arrangement, wherein the pipe is simultaneously rotated along its own axis, without any dedicated arrangement or means to rotate, to achieve the uniform heating throughout the surface area of the preformed pipes.

VII. The size of the system is very compact as there is no need for heavy air circulation blowers, rollers for transverse movements, deflectors etc. The size of the invention is substantially less than the equipment used in current state of art.

VIII. It is a significant development over the other systems which are described in this document that our system can accommodate pipes of modified lengths but those systems defined above can accommodate pipes of a fixed length only thus making the scope of the system limited to a particular length of pipe.

IX. Further, the state of art invention uses heavy mechanical assembly inside the heating systems which incur a heavy cost of periodic maintenance because of overall high temperature inside the system which also leads to overheating of the mechanical components. The associated safety risk is very high in such systems as it maintains high temperature inside the systems.

The present subject matter overcomes abovementioned disadvantages by use of electromagnetic rays to heat the system. In particular, the subject matter uses the infrared radiated directly onto the thermoplastic pipe to be heated. As stated, there is no need to wait for heat build-up due to absence of requirement of media to transfer the heat from the heating source to the preformed plastic pipes. The heating process is started from the moment the heaters are turned on prior to starting the process heating requirements leading to substantial savings of energy.

The present invention avoids heat loss as there is no heavy air currents circulation. Further, electric infrared energy, which is an electromagnetic wave, travels in straight lines from the heat source with no medium. This energy is directed into specific patterns by optically designed reflectors, Infrared, like light, travels outward from the heat source, and diffuses directly on to the product to be heated without heating the media which it travels through. With infrared, neither there is any need to heat the air first, nor is the heated air moved at a high velocity in order to heat the product. Infrared transfers heat directly to the product to be heated with minimal heat loss in air and without the need to purposely preheat the air before heating the product.

In one embodiment of the invention, the equipment comprises an infrared housing unit to enclose a plurality of infrared heating elements. In one embodiment of the invention, the infrared heating elements in form of a longitudinal strip elongated along the length of the PVC pipes. In another embodiment, the longitudinal strips of infrared heating elements are arranged in a given pattern to cover the maximum surface area for uniform heating of the PVC pipes. In one example the pattern can be parabola. The infrared housing unit of the invention has longer longitudinal length than the length of the preformed tubes/pipes. The longer longitudinal length of the infrared housing unit ensures back- and-forth movement of the preform PVC pipes to achieve greater uniformity in molecular orientation along the longitudinal axis of the pipe. Further, the invention comprises a handling arrangement to move the pipe along the axis and to rotate the pipe around the axis for uniform heating of the pipe along the complete surface area through specially designed rollers. The infrared housing further comprises reflectors along the inner surface area to reflect the infrared along the axis of the preformed plastic pipes. In one embodiment of the invention, the reflectors are arranged at different angles within the housing of the invention to reflect the infrared radiation to a focused area of the preformed plastic pipes.

The infrared housing unit of the invention comprises a handling arrangement with specific arrangement of a plurality of rollers to move the preformed plastic pipes back-and-forth. Further, each of the plurality of rollers are specially designed to cause rotational movement of the preformed plastic pipes as the pipes move back-and-forth movement. In one embodiment, the rollers are conical shape to facilitate the back-and-forth and rotational movements simultaneously. In another example, as the preformed plastic pipe reaches the end of the tunnel it is detected by a proximity detector mounted on both the ends of the infrared housing which gives the command to the control system and the pipe starts moving in opposite direction. In another example, the Infrared housing is also equipped with proximity detectors at multiple locations for locating the preformed plastic pipe inside the infrared housing such that the preformed plastic pipe is detected when it reaches the end of the infrared housing and made to move in the opposite direction. When the pipe reaches the opposite end it is again detected by proximity a detector which gives the command to the control panel to reverse the direction of the movement. In this way the pipe is made to rotate back and forth for the entire heating cycle to achieve uniform heating.

The invention can be used to selectively heat the portions of the preformed plastic pipes at different temperatures along the longitudinal length.

The invention described in this specification does not limit the scope of the invention to be used for other cylindrical articles apart from preformed plastic PVC pipes. For example, apart from preformed plastic pipes, polymers, and other thermoplastic materials may also be heated using the present invention to achieve uniform molecular orientation.

Now the invention will be described with reference to the accompanying drawings. FIG. 1 is the longitudinal view of the heating system (101) describes the most preferred embodiment of the invention. The infrared housing 102 of the invention comprises a plurality of infrared longitudinal strips (107-1 to 107N) extended along the longitudinal length of the invention. Each of the plurality of longitudinal strips 107 (1-N) comprises infrared heating element 103 which is arranged in longitudinal length. In one embodiment of the invention, the longitudinal strip 107N of the infrared heating element may comprise movable infrared heating elements to direct the radiation out of the heating element to focused region of preformed plastic pipes (106). The infrared housing may further comprise a proximity detector (112) such that as the preformed plastic pipe reaches the end of the tunnel it is detected by a proximity detector mounted on both the ends of the infrared housing (102) which gives the command to the control system (113) and the pipe starts moving in opposite direction. The invention further comprises a handling arrangement (108) which facilitates transition of the preformed plastic pipes 106. Further the handling system 108 also facilitates the rotational movement of preformed plastic pipes (106) along its longitudinal axis through rollers (202).

The preferred embodiment of the invention comprises plurality of reflectors 109-1 to 109-N which reflects the infrared radiation to the preformed plastic pipes to cover the maximum surface area of the preformed plastic tubes. In one embodiment of the invention the heat elements can be energized on as required basis. This control mechanism, also called "staging", leads to more uniformity in the heating of the preformed plastic tubes, but also is more energy efficient compared to the conventional systems as the heating elements are energized in accordance with the stage at which a PVC pipes are required heat treatment. In one embodiment of the invention the infrared housing unit may comprise a plurality of temperature sensors (112N) in each zone for uniform heating and to maintain different temperatures in each zone along the length of the system. When the required temperature is achieved which is detected temperature sensors (112N) which records the temperature on the surface of the pipe at multiple locations the heating cycle is complete and the door on the discharge side of the oven the heating systems (101) open and the preformed plastic pipe (106) is discharged to the orientation equipment for the subsequent process i.e. molecular orientation. Further, the handling arrangement may also comprise of motorized wheels (110) and tracks (111) at two positions of the invention equipment for the transverse movement of the equipment.

Figure 2:
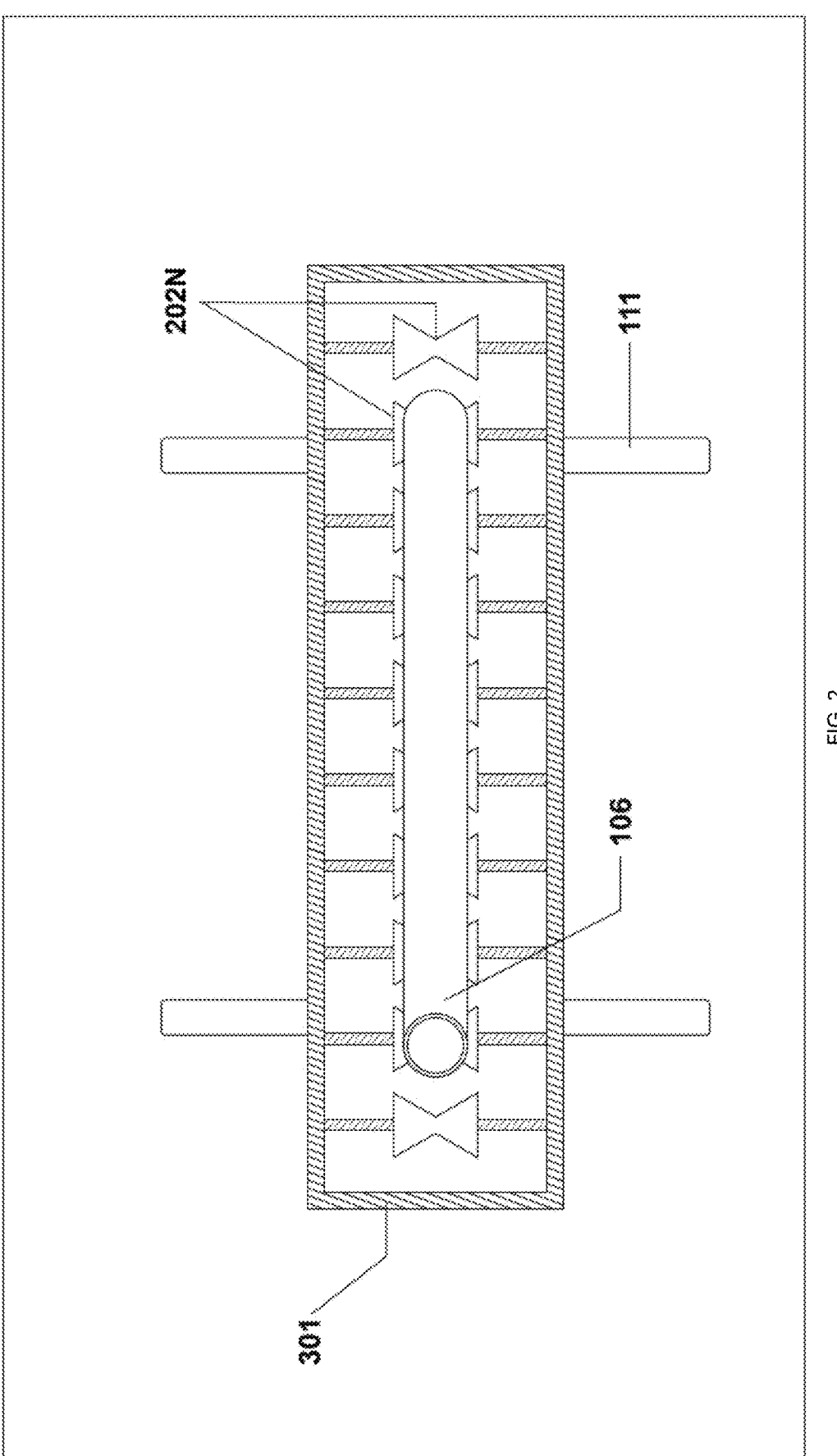
FIG. 2 is a Top View of the subject matter of the present application showing the infrared housing unit employed in the system.

FIG. 2 describes the handling arrangement through the top view of the invention. The handling arrangement comprises a plurality of rollers (202N) on which the preformed plastic pipes can transition along the axis in back-and-forth movement. In one embodiment of the invention the housing 102 is thermally insulated which prevents the heat loss through the system. In one embodiment, the plurality of rollers (202N) are arranged along the longitudinal length of the infrared housing unit and are motorized.

Figure 3:
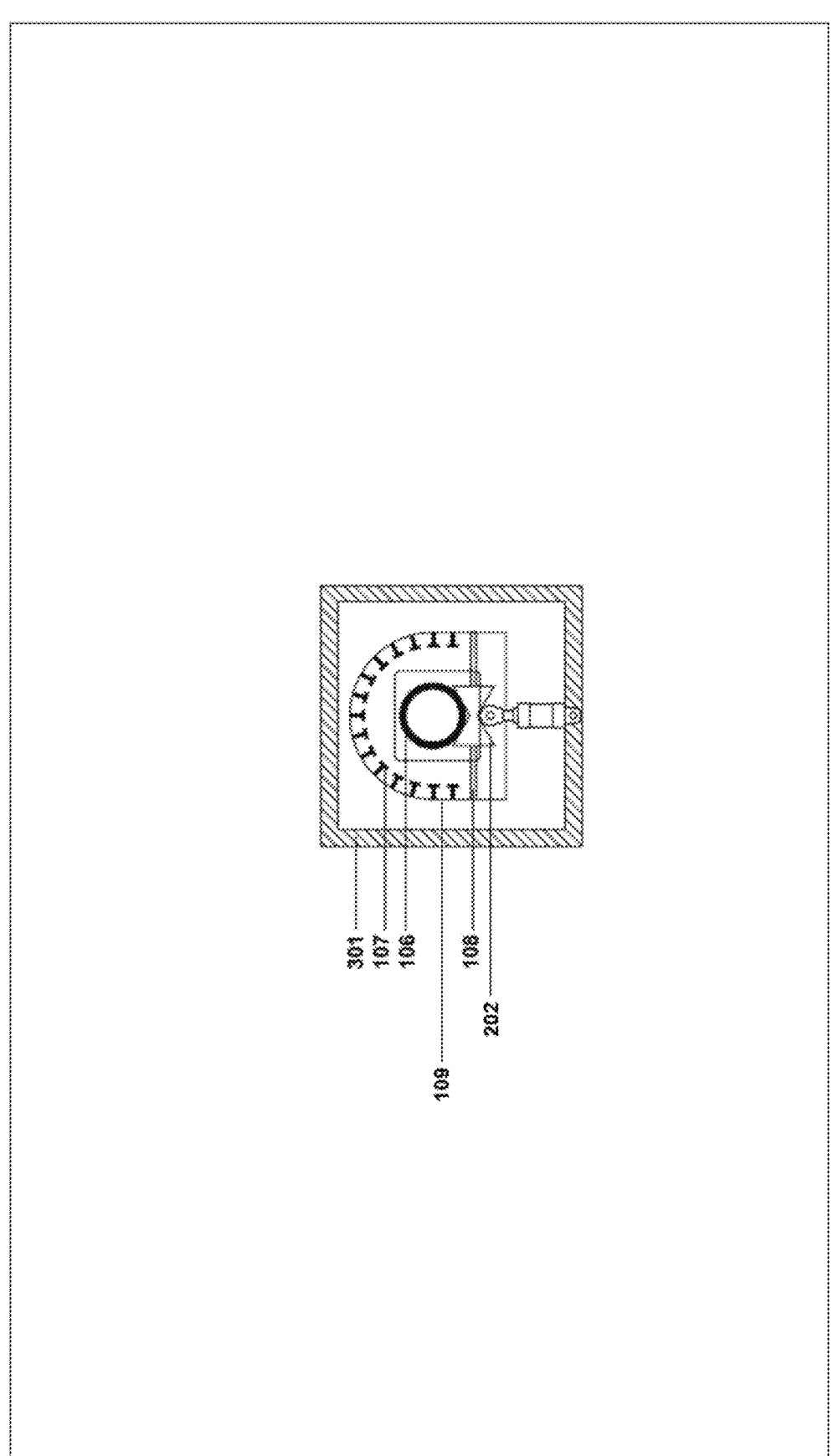
FIG. 3 is the front view of the subject matter of the present application showing the arrangements of infrared strips along the longitudinal axis of the subject matter of the present application.

FIG. 3 describes the front view of the invention. The housing system (102) may be insulated through thermal insulation (301). From the figure it is apparent that the infrared longitudinal strips 107 may be arranged in more than one patters, including as illustrated, a parabolic pattern in the infrared housing 102. The preformed plastic pipes are rotated with the help of rollers 202 along its axis to achieve the uniform heating. In preferred embodiment of the invention, the rollers 202 allow the pipe to move along the axis and rotate around the axis simultaneously with no additional arrangement to this effect.

The system is also made to move transverse (width wise) at different positions by motorized means on the tracks for feeding of the pipe to the system and in order to align a particular pipe station to the orientation equipment for the discharge of the pipe into the orientation equipment for subsequent process.

We claim:

1. A process to heat a preformed plastic pipe (106) in a heating system wherein the heating system (101) comprises
    an infrared housing unit (102) equipped with a plurality of infrared heating elements (103) arranged in a plurality of longitudinal strips (107N), wherein a longitudinal length of the infrared housing unit (102) is greater than a longitudinal length of the preformed plastic pipe (106);
    a handling arrangement of a plurality of rollers (202) on which the preformed plastic pipe (106) oscillate along and rotate around a longitudinal axis of the preformed plastic pipe simultaneously; and
    at least one proximity detector located in the infrared housing unit, wherein each proximity detector determines when the preformed plastic pipe reaches an end of the infrared housing, and subsequently commanding the heating system to move the preformed plastic pipe in an opposite direction;
    wherein the handling arrangement further comprise means for transverse movement of the heating system (101) by means of motorized wheels (110) and tracks (111) at multiple positions to facilitate a feeding and a discharge of the preform plastic pipe at different positions.

2. The process as claimed in claim 1, wherein the handling arrangement comprises the plurality of rollers (202) spaced out longitudinally and motorized to make the plastic pipe move longitudinally along its axis.

3. The process as claimed in claim 2, wherein an inner surface area of the infrared housing (102) comprises a plurality of reflectors (109N) arranged in a pattern to reflect infrared light to the preformed plastic pipe (106).

4. The process as claimed in claim 2, wherein the infrared housing unit (102) further comprises a plurality of temperature sensors (114N) in each zone for uniform heating and to maintain different temperatures in each zone along a length of the system.

5. The process as claimed in claim 1, wherein the infrared housing unit (102) further comprises at least two zones at different temperatures to heat the preformed plastic pipe (106) based on the physical characteristics of the preformed plastic pipe (106).

* * * * *